United States Patent [19]

Hurst et al.

[11] 4,080,626
[45] Mar. 21, 1978

[54] DISCONTINUOUS MOTION SPECIAL EFFECTS GENERATOR FOR TELEVISION

[75] Inventors: Robert Norman Hurst, Cherry Hill; Fred Wayne Huffman, Medford Lakes, both of N.J.

[73] Assignee: RCA Corporation, New York, N.Y.

[21] Appl. No.: 753,878

[22] Filed: Dec. 23, 1976

[30] Foreign Application Priority Data

Jul. 19, 1976 United Kingdom ............... 30006/76

[51] Int. Cl.² ............................................. H04N 5/14
[52] U.S. Cl. .................................... 358/160; 358/93; 358/22
[58] Field of Search ................... 358/141, 93, 160, 22, 358/82, 135, 136; 360/9, 10, 11, 33

[56] References Cited

U.S. PATENT DOCUMENTS

| 3,423,526 | 1/1969 | Law ...................................... 358/136 |
| 3,911,211 | 10/1975 | Rennick ................................. 360/10 |
| 3,990,105 | 11/1976 | Fast ....................................... 358/82 |

OTHER PUBLICATIONS

"Conditional Replenishment: A Promising Technique for Video Transmission", F. W. Mounts, Bell Laboratories Record, vol. 48, #4, Apr. 1970, pp. 110-115.
"Bandwidth Reduction for Television", Barnette and Olive, RCA TN, No. 152.

*Primary Examiner*—Robert L. Griffin
*Assistant Examiner*—Michael A. Masinick
*Attorney, Agent, or Firm*—Eugene M. Whitacre; Paul J. Rasmussen; Robert L. Troike

[57] ABSTRACT

A discontinuous motion special effects generator for television is described including a memory means responsive to a television video signal for storing signals representing a television picture field and memory control means for controlling the writing and reading of the picture fields. This generator includes means for automatically providing control pulses at a rate for desired discontinuous motion. The generator further includes means coupled to the memory control means and responsive to the control pulses for writing a single picture field of video only on the occurrence of each control pulse whereby the video output changes only on the occurrence of each control pulse.

10 Claims, 3 Drawing Figures

DISCONTINUOUS MOTION SPECIAL EFFECTS GENERATOR FOR TELEVISION

BACKGROUND OF THE INVENTION

This invention relates to a generator to produce a television signal which has the artistic effect obtained live by viewing moving objects with the sole illumination being a high intensity strobe light. This type of illumination is often used on stage or at parties to produce a subjective effect of discontinuous motion. In practice, this well known device pulses a high intensity strobe lamp from some source such as a pulse generator. When used as a sole illumination in a dark room, its sharp, short pulses of light cause the eye to retain frozen images of any moving object, giving the illusion of discontinuous motion. This invention provides means for achieving the same subjective result in any television image whether it comes from a live camera or a prerecorded source.

The recent advent of all-electronic digital field stores and frame stores has made practical the "electronic snapshot" whereby a single frame of, for example, some critical sports action may be snatched in real time from the continuous video signal and presented as a still picture for close inspection. In all prior art application the concept has been limited to a "single snapshot," taken at the discretion of the operator and held for an indeterminate period. Then again at the discretion of the operator, the store is terminated and live video is again applied to the output line.

SUMMARY OF THE INVENTION

A discontinuous motion special effects generator for television is provided including memory means responsive to a television video signal for storing signals representing a television picture field and memory control means for controlling the writing and reading of the picture fields. The generator further includes means for automatically providing control pulses at a rate for desired discontinuous motion and means coupled to the memory control means and responsive to the control pulses for causing the stored field readout of the memory to change in response to these control pulses.

DESCRIPTION OF THE INVENTION

Figure 1:
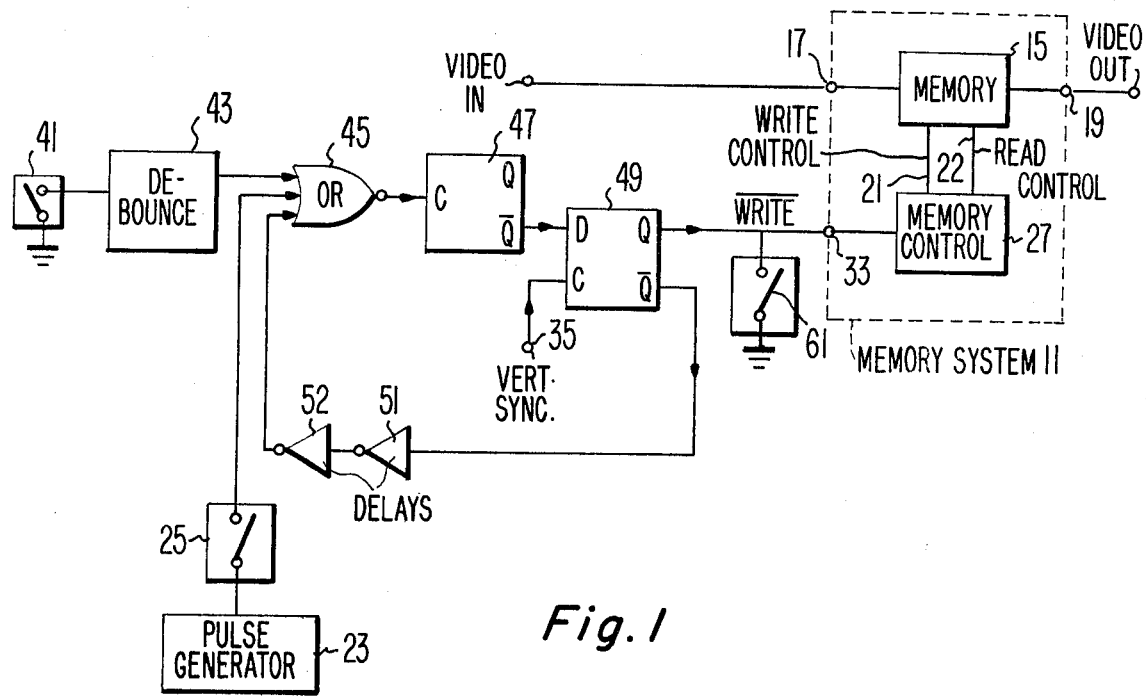
FIG. 1 illustrates a special effects video generator according to one embodiment of the present invention in combination with a memory system for producing the desired special effect of discontinuous motion.

Referring to FIG. 1, a memory system 11 outlined in dashed lines is presented in block form. This memory system 11 includes, for example, a memory 15 and a memory control 27. The memory system 11 may be, for example, a digital video synchronizer such as RCA type TFS-121, sold by RCA Broadcast Systems, Commerical Communication Systems Division, Front and Cooper Streets, Camden, N.J.

Basically, the memory system 11 accepts television video signals from an external source connected to terminal 17 and stores these video signals in a memory 15. The stored video signals in the memory 15 are read out at the video output terminal 19. The memory control 27 provides control signals to the memory 15 to control the writing of the video signal into the memory 15 and the reading of the information in the memory to the video output terminal 19. This reading and writing information is done on a field-by-field basis by writing a complete television field into the memory and then reading this field out of the memory without this reading and writing occurring at the same time. The memory 15 of the memory system 11 may include means for converting the video signals from analog to digital format and may further include a D to A converter to convert back to analog. The memory 15 may include circuits for developing address codes to store the picture information and read address codes for reading and circuits for providing local reference subcarrier, horizontal and vertical sync so that the picture information is timed with respect to a local sync generator. All of the above type of functions are achieved in the referenced RCA type synchronizer. The memory control 27 is designed so that in response to a low level at its input terminal 33 it will provide a write control signal via lead 21 to the memory 15 which will cause the writing of the new video information at terminal 17 into the memory 15 and allow the reading from the memory 15. The reading out of the memory is controlled by a read control signal provided from memory control 27 to memory 15 via lead 22. When the write inhibit input level to terminal 33 of the memory control 27 is at a high level, a control signal is applied via lead 21 to the memory 15 and no new video is stored into the memory. When the voltage at the write control lead inhibits the new video into the memory 15, the read control signal causes the video output read from the memory to be a continuous reproduction of the last field written into the memory. This may be done in various ways depending upon the type of memory. In one type of memory, this is done by simply reading the stored information in the memory and in another type of memory the information is recirculated and rewritten into the memory before being read out of the memory.

The artistic effect similar to that obtained by a high intensity strobe lamp — the illusion of discontinuous motion wherein the eye retains frozen images — is achieved by the circuit illustrated in FIG. 1 in combination with the memory system 11, when the video signal information at the input terminal 17 is representative of moving objects. A variable pulse generator 23 which may typically be set at a 1 pulse per second repetition rate is coupled when switch 25 is closed to an OR gate 45. The output of OR gate 45 is coupled to a toggle flip-flop 47. The pulses from generator 23 are short duration toggle or trigger type pulses. Toggle flip-flop 47 may be, for example, a J-K flip-flop as described on Page 15-10 of "Handbook for Electronics Engineering Technicians" by Milton Kaufman and Arthur H. Seidman. This type of flip-flop changes state on the occurrence of a pulse at clock or toggle input C. The $\bar{Q}$ output terminal of flip-flop 47 is coupled to the D input of delay D-type flip-flop 49. A D-type flip-flop 49 is described on Page 15-12 of the above cited handbook. This type of flip-flop provides the level at the Q terminal which corresponds with the level at the D input terminal on the occurrence of a pulse at the clock or toggle input C. Vertical sync pulses are applied to the C or clock (toggle input) of the D-type flip-flop 49 via terminal 35. The Q output terminal of the D-type flip-flop 49 is coupled to the terminal 33 of memory control 27. The $\overline{Q}$ output terminal of flip-flop 49 is coupled via delay inverters 51 and 52 to OR gate 45. Also applied to the OR gate 45 is the output from a variable debounce circuit 43. A push button switch 41 is coupled to a debouncing circuit 43. The switch 41 with the circuit 43 produces a toggle pulse at the output of the de-bouncing circuit each time the button of switch 41 is depressed. The de-bounce circuit 43 in response to the momentary closure of push button switch 41 produces a clean output pulse without the damping signal usually associated with the momentary closure of the push button switch.

Figure 2:
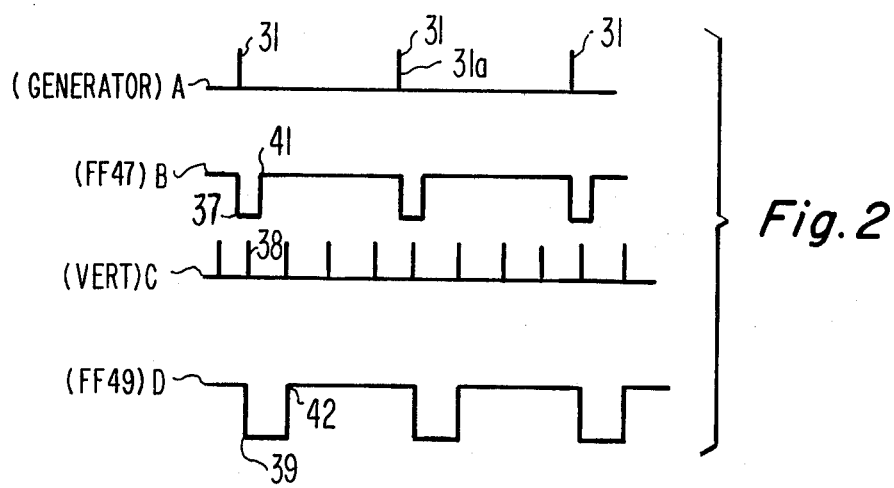
FIG. 2 is a set of waveforms useful in illustrating the operation of the system of FIG. 1.

Referring to FIGS. 1 and 2, when switch 25 is closed, toggle pulses 31 at 1 pulse per second rate (waveform A of FIG. 2) for example are provided through OR gate 45 to the first flip-flop 47 causing the output at terminal $\overline{Q}$ of flip-flop 47 to go to a low state as indicated at point 37 in waveform B of FIG. 2. This low at $\overline{Q}$ terminal of flip-flop 47 provides a low at D terminal of D-type flip-flop 49. The Q and $\overline{Q}$ outputs of flip-flop 49 remain however in the previous state until the arrival of a pulse (pulse 38 in waveform C of FIG. 2) to the C input of this flip-flop. The arrival of a vertical toggle pulse, (vertical sync) at the C input of second flip-flop 49 causes Q output terminal of this flip-flop to go low (see point 39 of waveform D of FIG. 2) providing a low at terminal 33. This low at terminal 33 causes the memory 15 to start writing or storing new input video at the beginning of the field. The $\overline{Q}$ output of the second flip-flop 49 goes high when Q goes low and that high level is applied through delay inverters 51 and 52 to the intput of OR gate 45. The high at OR gate 45 causes a high level signal of toggle pulse at the toggle input C of the first flip-flop 47 causing the $\overline{Q}$ output of the first flip-flop 47 to go to a high level as indicated at point 41 in waveform B of FIG. 2. This provides a high level to the D input of the second flip-flop 49. With the arrival of the next vertical sync pulse to the C input of second flip-flop 49, the output of the Q terminal of this flip-flop goes to a high level (see point 42 of waveform D of FIG. 2) causing a high at terminal 33 and a write inhibit control signal to be applied to the memory 15. The memory 15 ceases writing or storing new information and the last written video field in the memory is repeatedly read out of the memory 15. In this state, the system provides the same fixed or "frozen" image. On the occurrence of the second pulse 31a from generator 23, the operation as discussed above reoccurs and a low is provided to memory control 27 in synchronism with the next vertical sync pulse at terminal 35 to cause the writing or storing of a single field of the new video present at terminal 17. The $\overline{Q}$ high level from flip-flop 49 again through delays 51 and 52 causes in response to the next vertical sync pulse at terminal 35 a high level at the Q terminal of flip-flop 49. The high level at the input memory of control 27 provides the inhibit to the video input and video output returns to the "frozen" image until the occurrence of another pulse from generator 23. This writing of updated video and freezing reoccurs with new or updated video occurring at the repetition rate of the generator producing the desired special effect of discontinuous motion similar to that produced on stage by viewing moving objects with the sole illumination being a strobe light. The repetition rate of of generator 23 may be selected to be similar to that of the strobe light. This special effect may be stopped simply by opening switch 25. A continuous-freeze image or a manually switched freeze image may be provided with switch 25 open by depressing switch 41. Each time switch 41 is depressed, the operation is similar to that which occurs when a single pulse 31 is applied from generator 23, namely, a single new field of video is written into the memory with the system automatically returning to the "freeze" condition on the occurrence of the next vertical sync pulse.

Switch 61 is provided in FIG. 1 to connect terminal 33 to ground when closed. This provides a continuous low into the system when closed causing continuous video to be written into and read out of the memory system. With switch 61 open as illustrated in FIG. 1, the memory system is under the control of the logic circuit of FIGS. 1 or 3.

Figure 3:
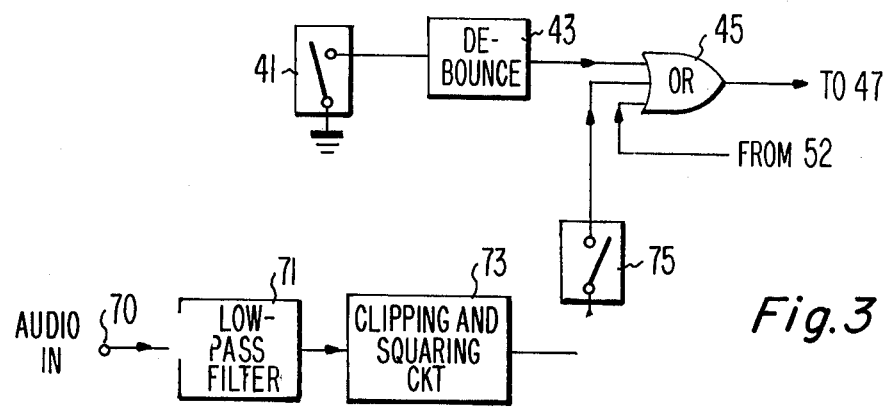
FIG. 3 is another embodiment of the present invention for producing the special effect of discontinuous motion in synchronism with audio.

A very useful modification to the basic information is shown in FIG. 3 wherein a low-pass filter extracts from the audio signal at terminal 70 the low frequency components representing the rhythm of the music accompanying the video signal. This low frequency audio signal is converted to a pulse by clipping and shaping circuit 73, and the resultant pulse is applied when switch 75 is closed as one of the inputs to the OR gate 45. The "frozen" pictures will then appear at a rate synchronous with the audio; more specifically, at a rate synchronous with the beat of the music.

What is claimed is:

1. A discontinuous motion special effects generator system for television, comprising:
   memory means responsive to a television video signal for storing signals representing a television picture field,
   memory control means for controlling the writing and reading of the picture fields,
   means for automatically providing control pulses at a predetermined rate for purposely providing the special effect of discontinuous motion, and
   means coupled to said memory control means and responsive to said control pulses for causing the stored field readout of the memory to change in response to said control pulses.

2. The combination of claim 1 wherein said means for causing the readout of the memory to change in response to said control pulses includes means coupled to said memory control means responsive to said control pulses for writing a single picture field of video only on the occurrence of each control pulse whereby the video output readout of the memory changes only on the occurrence of each control pulse.

3. The combination of claim 1 wherein said means for automatically providing control pulses includes a pulse generator.

4. The combination of claim 3 wherein said pulse generator has a pulse repetition rate on the order of 1 to 2 pulses per second.

5. The combination of claim 1 wherein said means for automatically providing control pulses includes means responsive to audio signals for producing control signals.

6. The combination of claim 5 wherein said means responsive said audio signal includes a low pass filter for passing the low frequency components representing the rhythm of music that may be accompanying the video.

7. The combination of claim 5 including a clipping circuit coupled to the output of said low pass filter.

8. A discontinuous motion special effects generator system for television, comprising:

memory means responsive to a television video signal for storing signals representing a television picture field, memory control means for controlling the writing and reading of the picture fields, and means coupled to said memory control means and responsive to audio signals accompanying the television signal for causing the stored field readout of the memory to change with the audio signals.

9. The combination of claim 8 wherein the last mentioned means includes means for changing the stored readout in synchronism with the rhythm of music.

10. The combination of claim 9 wherein the last mentioned means includes a low pass filter.

* * * * *